Jan 6, 1931.  L. C. HUCK  1,787,527
BRAKE FOR AUTOMOTIVE VEHICLES
Original Filed March 29, 1926  6 Sheets-Sheet 1
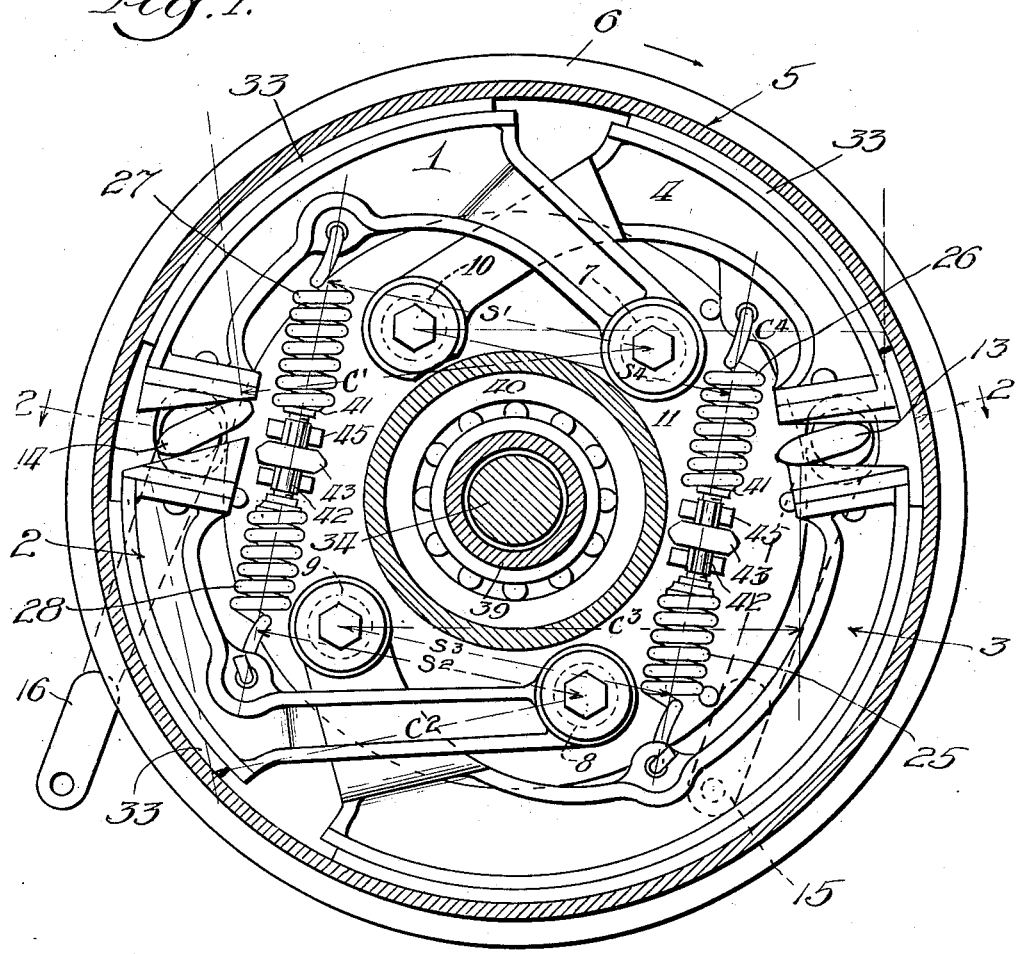
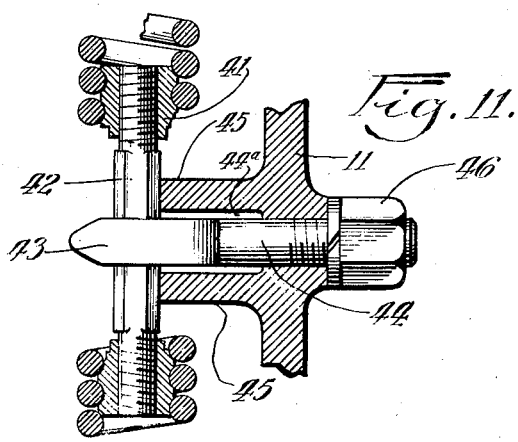
Inventor:
Louis C. Huck,
By Wallace R. Lane
Atty.

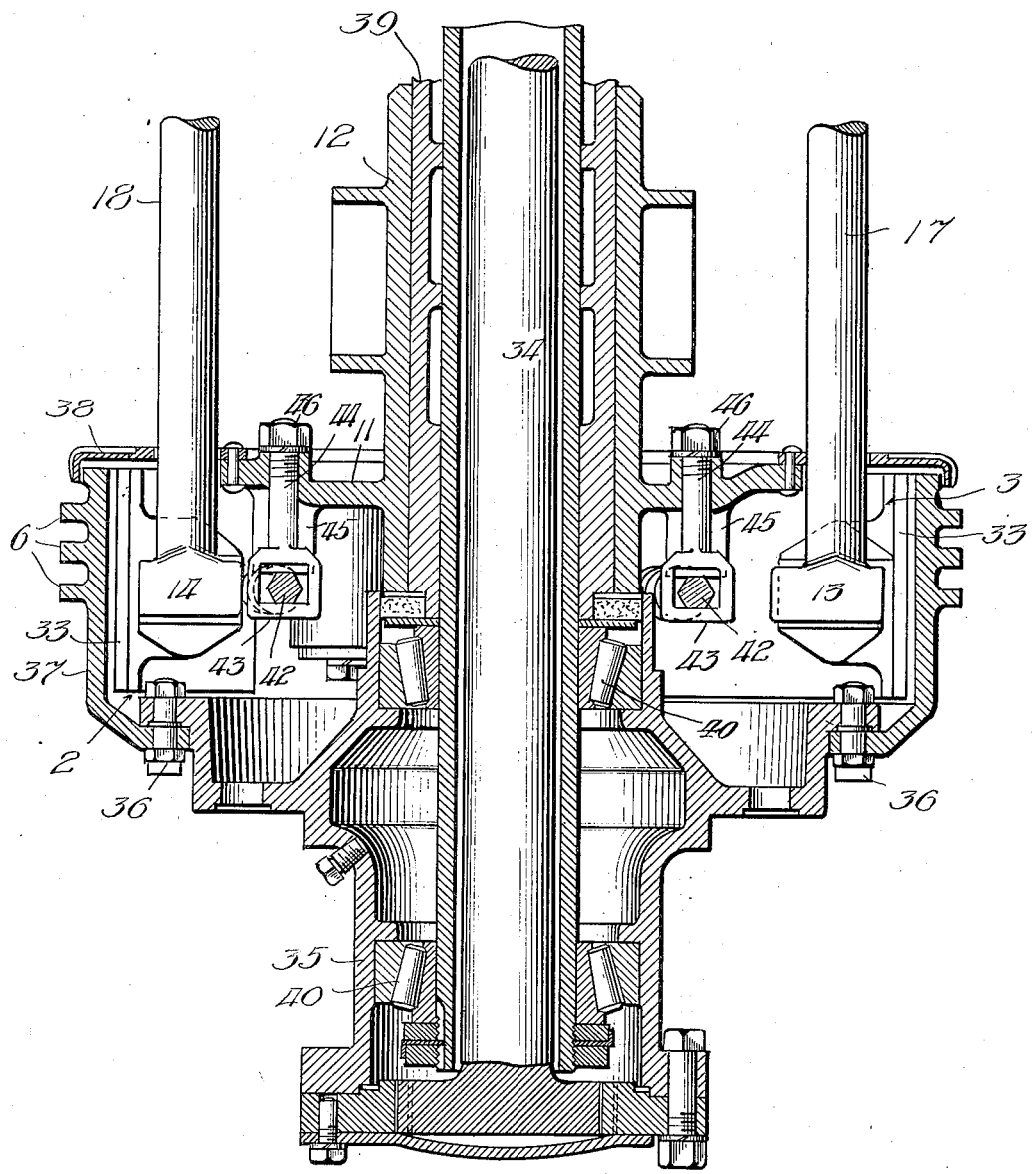

Jan. 6, 1931. L. C. HUCK 1,787,527
BRAKE FOR AUTOMOTIVE VEHICLES
Original Filed March 29, 1926  6 Sheets-Sheet 3

Inventor:
Louis. C. Huck,
By Wallace R. Lane

Jan 6, 1931.  L. C. HUCK  1,787,527
BRAKE FOR AUTOMOTIVE VEHICLES
Original Filed March 29, 1926  6 Sheets-Sheet 4
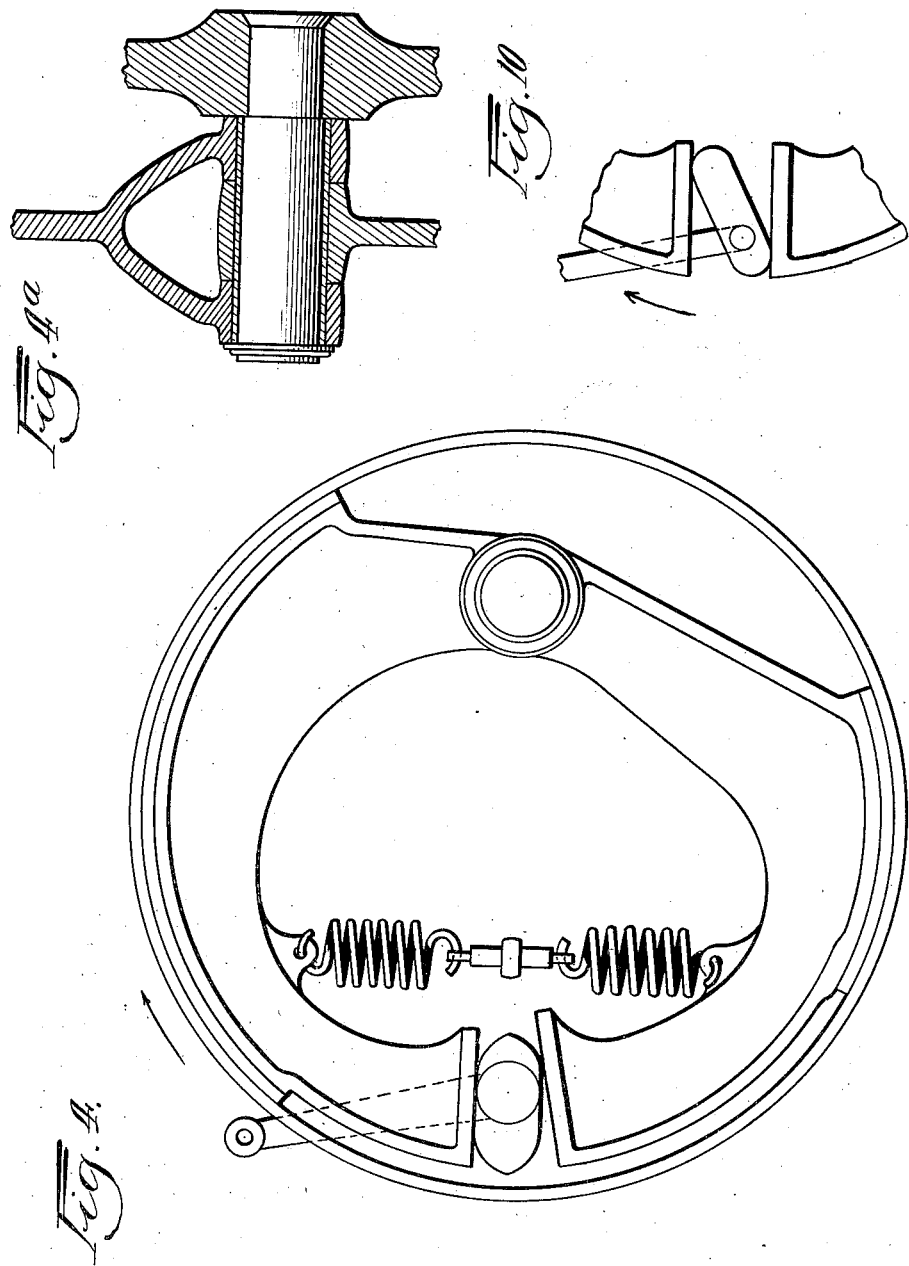
Inventor:
Louis C. Huck,
By Wallace R. Lane
Atty.

Jan 6, 1931.  L. C. HUCK  1,787,527
BRAKE FOR AUTOMOTIVE VEHICLES
Original Filed March 29, 1926   6 Sheets-Sheet 5
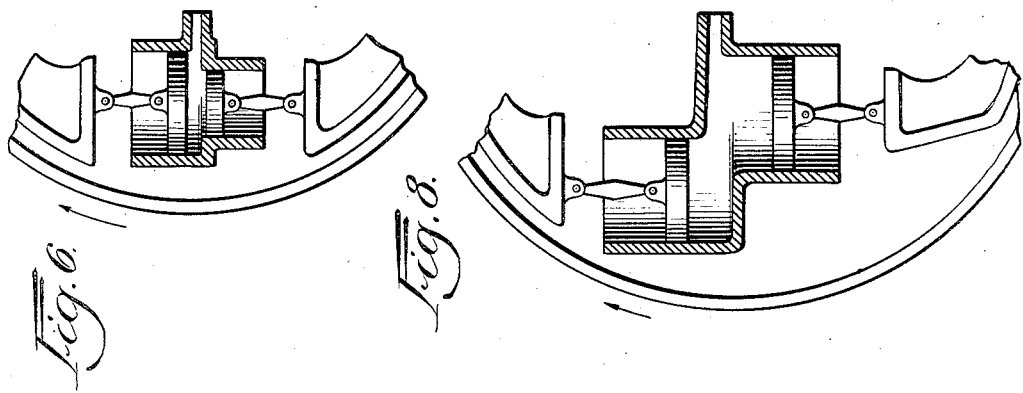
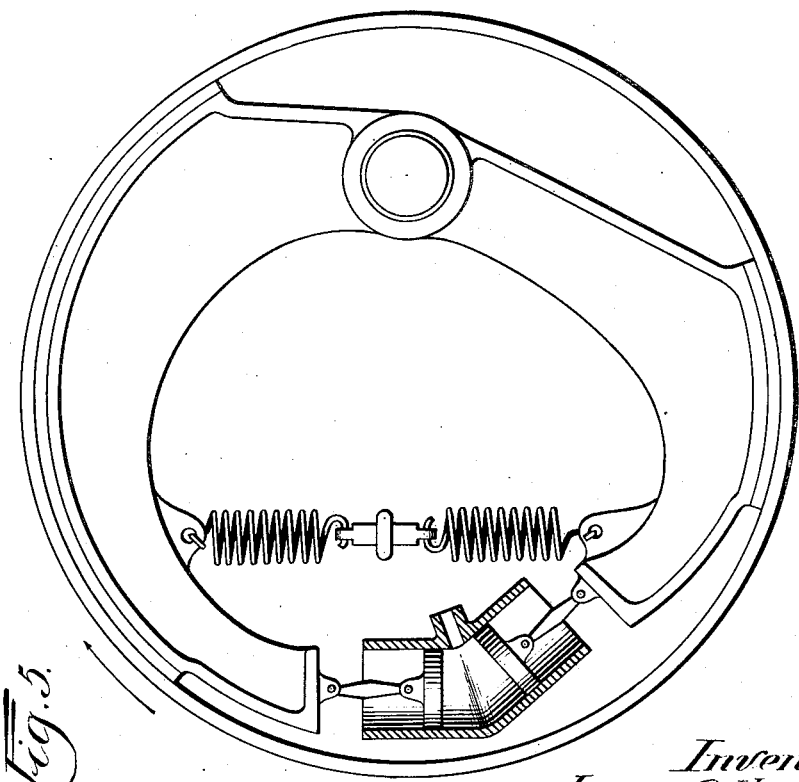
Inventor:
Louis C. Huck,
By Wallace R. Lane
Atty.

Jan 6, 1931.  L. C. HUCK  1,787,527
BRAKE FOR AUTOMOTIVE VEHICLES
Original Filed March 29, 1926  6 Sheets-Sheet 6
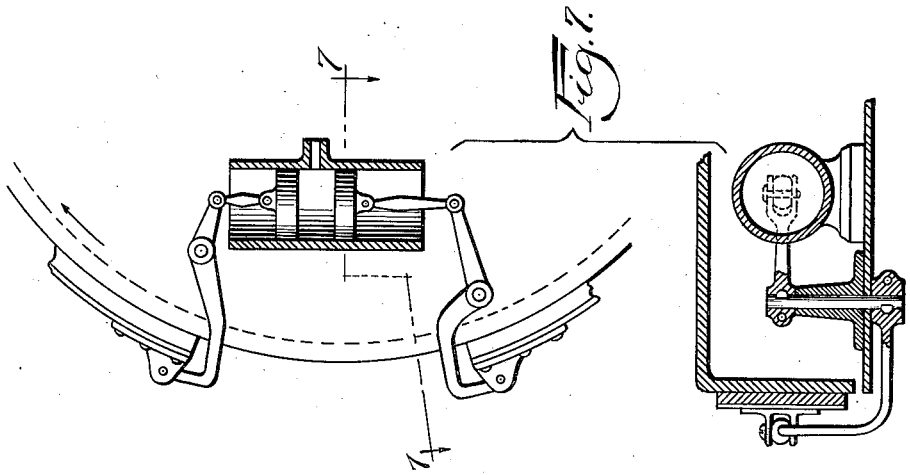
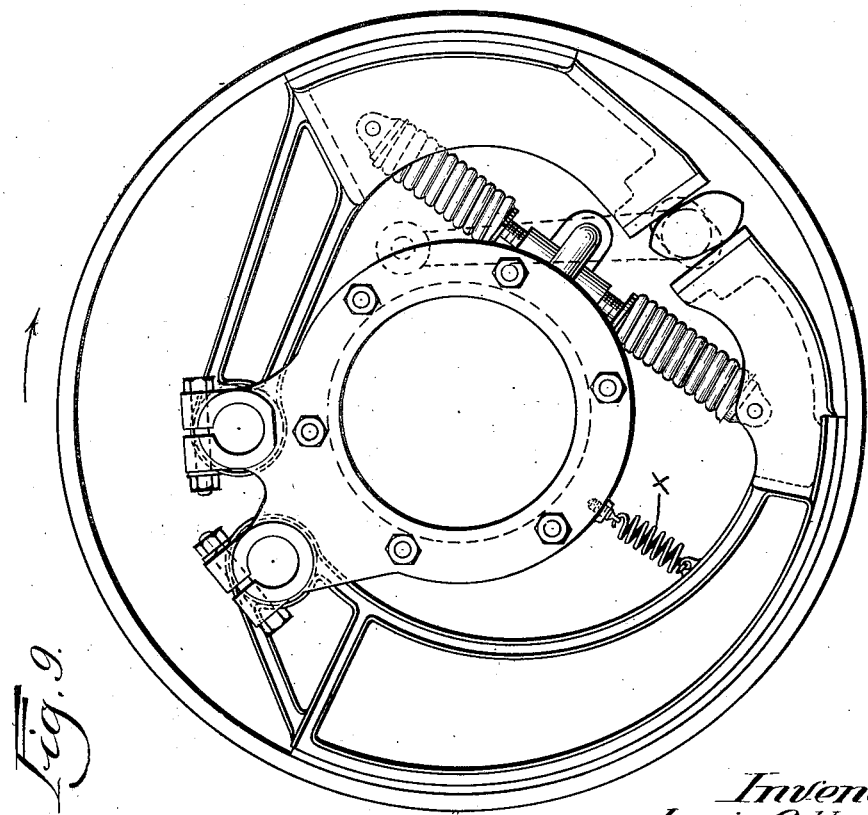
Inventor:
Louis C. Huck,
By Wallace R. Lane Patented Jan. 6, 1931

1,787,527

UNITED STATES PATENT OFFICE

LOUIS C. HUCK, OF NEW YORK, N. Y., ASSIGNOR TO HUCK AXLE CORPORATION, OF CHICAGO, ILLINOIS, A CORPORATION OF ILLINOIS

BRAKE FOR AUTOMOTIVE VEHICLES

Application filed March 29, 1926, Serial No. 98,084. Renewed March 22, 1930.

This invention relates to brakes for automotive vehicles and contemplates among other things the utilization of the inertia of the moving vehicle to assist the pressure applied through the foot pedal, hand lever or other mechanical parts for applying the brakes.

Besides greater ease of operation, brakes that are as sensitive as possible without being "grabby" are desirable, as they allow the reduction of the mechanical advantage in the brake operating linkage. This reduction in turn results in less frequent adjustments for wear, elimination of the necessity for an uncomfortably great pedal throw, and in the case of internal brakes makes it possible to "follow up" the greater expansion of the brake drum due to heating.

To obtain the desired degree of sensitiveness it is desirable to bring an outside force into play to assist the muscular effort, thereby reducing pedal and lever pressures necessary to operate the brakes. There are a number of forces that can be utilized for this purpose, such as compressed air, intake manifold vacuum, inertia of the moving vehicle, etc. The present invention is more particularly concerned with the use of the last named force, which will be hereinafter referred to as the use of self-actuation.

While this invention is illustrated and described in connection with brakes for heavy vehicles I wish it understood that the principles are equally applicable to brakes for lighter vehicles and passenger cars, and to brakes actuated entirely or partially by means other than muscular effort.

If in the type of brakes described in the preceding paragraphs any braking action is being accomplished by a shoe, it is because of pressure between the shoe and drum brought about by a torque tending to swing the shoe about its anchor pin center against the inner surface of the drum. Barring variations in the coefficient of friction with a change in the unit normal pressure, etc., which variations are negligible for all practical considerations, it can be said that the amount of braking action is proportional to the torque tending to swing the shoe about its anchor pin against the inner surface of the drum. The forces producing this actuating torque are the cam pressure or force derived from the actuating mechanism and the frictional forces, and the net actuating torque is the algebraic sum of the torques produced by these forces respectively; i. e. if the torques of both forces are in the same direction they add, if in opposite directions they subtract. A shoe in which these torques are in the same direction will hereinafter be termed a self-actuating shoe or a shoe having positive actuation, and a shoe in which these torques are in opposite directions will be termed a non-self-actuating shoe, or a shoe with negative actuation. Frictional losses and release spring pull are considered negligible.

It is obvious that in any brake having opposed shoes actuated to swing in opposite directions one shoe will be a self-actuating shoe and the other a non-self-actuating shoe, and if the direction of rotation of the brake drum is reversed the former shoe will become the non-self-actuating shoe and vice versa.

Besides having the brakes sensitive it is desirable to have them sensitive in either direction of vehicle travel, i. e. in either direction of brake drum rotation.

If the actuating mechanism does not provide differentially acting actuation means to result in a definite division of pressure regardless of unequal clearances between the drum and each shoe, respectively, and regardless of the direction of rotation of the brake drum, such as would be the case if the actuating mechanism consisted of a fixed or journaled cam, the beneficial action of the positive actuation of the self-actuating shoe will be substantially offset by the negative actuation of the non-self-actuating shoe, as the wear of the shoes and consequently the pressure between shoes and drum will be determined by the angle through which each shoe, respectively, swings about its anchor pin with a given movement of the actuating means, i. e. in this case for a given angular movement of the cam shaft. It is obvious that for the same amount of wear the non-self-actuating shoe will require more cam pressure, and if the shoes are symmetrical, and assuming the cam pressure to be working through the same length of lever arm about the anchor pin in the case of both shoes, the cam pressure on the non-self-actuating shoe would have to be enough greater than the cam pressure on the self-actuating shoe to cause the cam torque, minus the frictional torque on the former shoe, to be equal to the sum of these two torques acting on the latter shoe. Obviously, such a brake would not be comparatively sensitive, as only a small part of the effort actuating the cam would be applied to the more efficient self-actuating shoe. By making the throw of the cam or actuating linkage to one shoe greater than to the other shoe for a given movement of the actuating means any desired division of pressure between the two shoes can be effected. The same results can be accomplished by making the shoes unsymmetrical, such as using a greater area of lining on the self-actuating shoe. However, if such methods are resorted to, though it will increase the sensitiveness of the brakes in the one direction of drum rotation, it will have the effect of rendering the brakes even less sensitive in the opposite direction of rotation unless differentially acting actuating means are used.

In order to gain the greatest assistance from the self-actuation effect in either direction of rotation it is preferable to divide the cam pressure substantially equally between the shoes regardless of direction of rotation of brake drum. In the invention herein set forth this purpose is accomplished by floating the brake actuating means, i. e. allowing the actuating means to have a differential or compensating action, and centralizing the shoes by means of a spring balance method more particularly described in my copending application Serial No. 573,946.

One of the objects of this invention is to obtain two independent sets of internal brakes in one drum and retain the longest possible life of the service set before relining is necessary. Another object is to provide brakes having the desired ratio of sensitiveness in forward direction of rotation to sensitiveness in reverse direction of rotation. Another object is to provide brakes so arranged as to cause the movement of the point on each shoe of a set at which the yielding means for positioning the free ends of the shoes is applied to be substantially the same as the brake liners wear in service, or if an unsymmetrical actuating means is used, such as the cam illustrated in Fig. 10, and the yielding means for positioning the free ends of the brake shoes is applied to the cam shaft, an object of this invention is to provide brakes so arranged that the distance through which this point of application of the positioning force moves, as the brake liners wear, will be minimized. Automotive vehicle brakes are used by far the greatest percentage of the time to decelerate the vehicle when in forward motion. It is, therefore, obvious that the self-actuating brake shoe for drum rotation during forward motion of the vehicle will, if the actuating mechanism devides the actuating force equally between the two shoes, do far more braking than the non-self-actuating shoe for that direction of drum rotation.

It is one object of this invention to provide a self-actuating shoe of one set of brakes for forward motion having the longest arc of contact advisable in view of the practical limitations, such as the decrease of radial movement for a given angular movement of shoe as the shoe is extended towards the ends of a diameter drawn through its anchor pin center, and to extend this shoe substantially the entire width of the drum. It is a further object to provide a non-self-actuating shoe to be opposed to the aforementioned shoe (and to serve as the self-actuating shoe in reverse direction of rotation) having a shorter arc of contact, but yet long enough to at least wear as long as, or outwear, the self-actuating shoe liner. As the greatest part of the cost of relining brakes is in laying up the vehicle, removing wheels, etc., it is good economy to reline both shoes of a set even though one of the shoes has more lining left on it than the other. Accordingly, if the term life is used in the sense of frequency of brake relining it can be said that shortening the non-self-actuating shoe for forward direction of rotation will not decrease the life of that set of brakes. Even though the self-actuating shoe is made as long as practical, the shortening of the non-self-actuating shoe enough to balance the wear for the average coefficient of friction and the average ratio of forward to reverse braking will leave enough arc of the brake drum available for the installation of another set of brakes also extending substantially the entire width of the drum.

The ratio of the torque of the frictional forces acting on a shoe about the anchor pin to the sum of the torques of the actuating force and the frictional forces both about the anchor pin is a measure of the self-actuation of a shoe, and this ratio is a function of the coefficient of friction, the ratio of the radius of the brake drum to the distance from the center of the drum to the anchor pin center, and the length and position of the arc of contact between the brake shoe and the drum with reference to a diameter drawn through the anchor pin center. The rigidity of the parts also has a bearing on this ratio or measure of self-actuation. This is especially true when commercial tolerances are considered. Such tolerances will allow the brake drum to "run out" to a certain degree, the effect of which will be to give a greater proportion of the total normal or radial pressure on the shoe to that part of the shoe coinciding with the shortest radius of the brake drum (by reason of "run out" due to eccentricity, out of roundness or other distortion of brake drum), than would be the case were the brake drum running absoultely true commercial tolerances in the location of anchor pin position would also cause higher pressures on certain part of the arc of contact than were these positions absolutely accurate. Should this increase in pressure occur at the toe end, i. e. free end of the shoe, the actuation characteristic of the shoe would be increased to possibly a point where if the shoe in question is a self-actuating shoe it might become self-locking. To avoid such an occurrence it is advisable to relieve the toe of the shoe, i. e. make it less rigid so that under high pressures at the toe or free end of the shoe the toe can deflect sufficiently to allow the rest of the shoe which is less sensitive to come in contact with the drum and take a share of the total radial pressure on the shoe.

If the two shoes of a set having floating, i. e. differentially acting actuating means, designed to wear about equally have not the same or symmetrically placed arcs of brake lining contact with respect to a diameter drawn through their common or respective anchor pin centers, it is necessary in order to have substantially the same amount of actuation in either direction of rotation, to vary another factor upon which the actuation depends to substantially counteract the effect of the unsymmetrical arcs of contact. In one embodiment of this invention the ratio of the drum radius to the anchor pin distance is varied to accomplish this purpose, and accordingly in this embodiment each shoe has an anchor pin and these anchor pins are not symmetrically located. If a common anchor pin for both shoes of a set is used proper positioning of the shorter liner on the non-self-actuating shoe for forward rotation with respect to a diameter through anchor pin center will give the same actuation, and by making the area of the non-self-actuating shoe less than the self-actuating shoe (forward rotation being considered) the frequency of the necessity of centralization or repositioning of the yielding support for the free ends of the brake shoes and floating actuation means, is reduced.

Another object of my invention is to provide a brake mechanism having two independent sets of brakes of two shoes each arranged in the same plane (i. e. to operate in substantially the same circular path), in circular succession within the brake drum, each of the shoes being pivoted about a separate anchor pin so located as to most efficiently utilize self-actuation and give the longest possible life before relining is necessary.

Another object is to provide each shoe with a separate anchor pin so positioned as to give that shoe substantially the same amount of self-actuation as each of the others, when the position of arc of lining with respect to a diameter through the pivot center can not be used to control the self-actuation by reason of another set of shoes being used in the same drum.

A further object is to produce a brake capable of maximum braking action with a given brake drum diameter.

A still further object is the provision of a sensitive brake that can be used on either light or heavy automotive vehicles without unduly increasing the diameter of the brake drum.

If a floating actuation means is used some provision must be made to centralize or hold the shoes in position within the brake drum. In this invention the spring balance means fully described in my copending application Serial No. 573,946 is used. The resistance to displacement of the shoes due to their weight and road shock is dependent on the rate or stiffness of the spring, and if a stiff spring is used the tension may increase beyond desirable limits as the brakes are adjusted to compensate for wear. Accordingly, it is desirable to provide means for adjusting the tension of the release springs, and a further object of this invention is to provide means for such an adjustment.

If in a set of brakes having substantially differentially acting actuation means the effective lever arms of the two shoes of a set through which the cam force acts about the anchor pin center do not bear the same ratio to the respective effective lever arms through which the release springs act about the anchor pin a force tending to move the shoes towards a point where this ratio will be the same for both shoes will be set up. The amount of this force depends on the tension of the release springs and the difference between the aforementioned ratios of lever arms of the two shoes. It is another object of this invention to control the ratio of these lever arms by varying the cam plate angles, or by varying the direction of and location of point of application of the release spring pull, or by a combination of these two methods. By these methods it is possible to create a force acting to oppose and substantially counteract the force of gravity, which force of gravity for certain relative positions of shoes and anchor pins would destroy the balance of the release springs forces and pull the shoes out of correctly centered position. This same action can be obtained by using a spring of somewhat greater strength on one side of the spring balance, or by using an auxiliary spring with or without means for adjusting its tension.

The effective mechanical advantage of a brake shoe may be defined as the ratio of total radial pressure on the brake liner brought about by the torque of the actuating force on the brake shoe acting about its anchor pin center to the actuating force itself. In order to control the ratio of braking in forward to braking in reverse direction of rotation for a given pedal pressure it is desirable to control the mechanical advantage of the shoes. Accordingly, another object of this invention is to provide a means and method of varying the mechanical advantage of a shoe.

Other objects, advantages and capabilities will hereinafter more fully become apparent.

My invention further resides in the combination, construction and arrangement of parts illustrated in the accompanying drawings, and while I have shown therein a preferred embodiment I wish it understood that the same is susceptible of modification and change without departing from the spirit of my invention.

The term "differentially acting actuating means" is used to describe a means of applying pressure or force to two brake elements or shoes in such a way as to maintain a definite division of the total actuating force or pressure transmitted by the actuating means, regardless of unequal resistance to movement of or unequal clearance between the two brake elements or shoes, and the brake drum. The term "substantially" as added to the term "differentially acting actuating means" is used to signify the fact that even if the actuating means has bodily movement against, or differentiates against frictional resistance or against the resistance of a support designed to yield either resiliently or otherwise, the division of pressure, though modified by this frictional or resilient resistance, is considered to act differentially and to consequently result in a definite division of pressure notwithstanding the various conditions above recited.

In the drawings, the arrows indicate the direction of the brake drum rotation against which most of the braking is done, which in the case of automotive vehicles is generally the direction of drum rotation corresponding to forward vehicle motion.

Fig. 1 is a vertical face view of the brake mechanism with the drum and axle in section and looking inwardly from the outside of rear right hand wheel (with relation to the direction of forward travel of the car) with sufficient parts removed to permit view of the brake shoes and associated parts.

Fig. 2 is a transverse horizontal section substantially on the line 2—2 of Fig. 1.

Fig. 4 is a side elevation of a modified form of brake showing the lower release spring stiffer than the upper spring.

Fig. 4a is a fragmentary transverse section through the shoe anchor pin of Fig. 4.

Fig. 5 is a further modification showing hydraulic actuating means for the shoes.

Figs. 6, 7 and 8 are similar views, but showing still other arrangements of the hydraulic cylinder, pistons and linkage connecting the pistons to the shoes for actuating the same.

Fig. 9 is another modified form of brake showing a pair of brake shoes, each shoe having a separate anchor pin, a separate or auxiliary spring being shown to assist in compensating for the weight of the lower shoe and to control clearances between each shoe and the brake drum.

Figure 3:
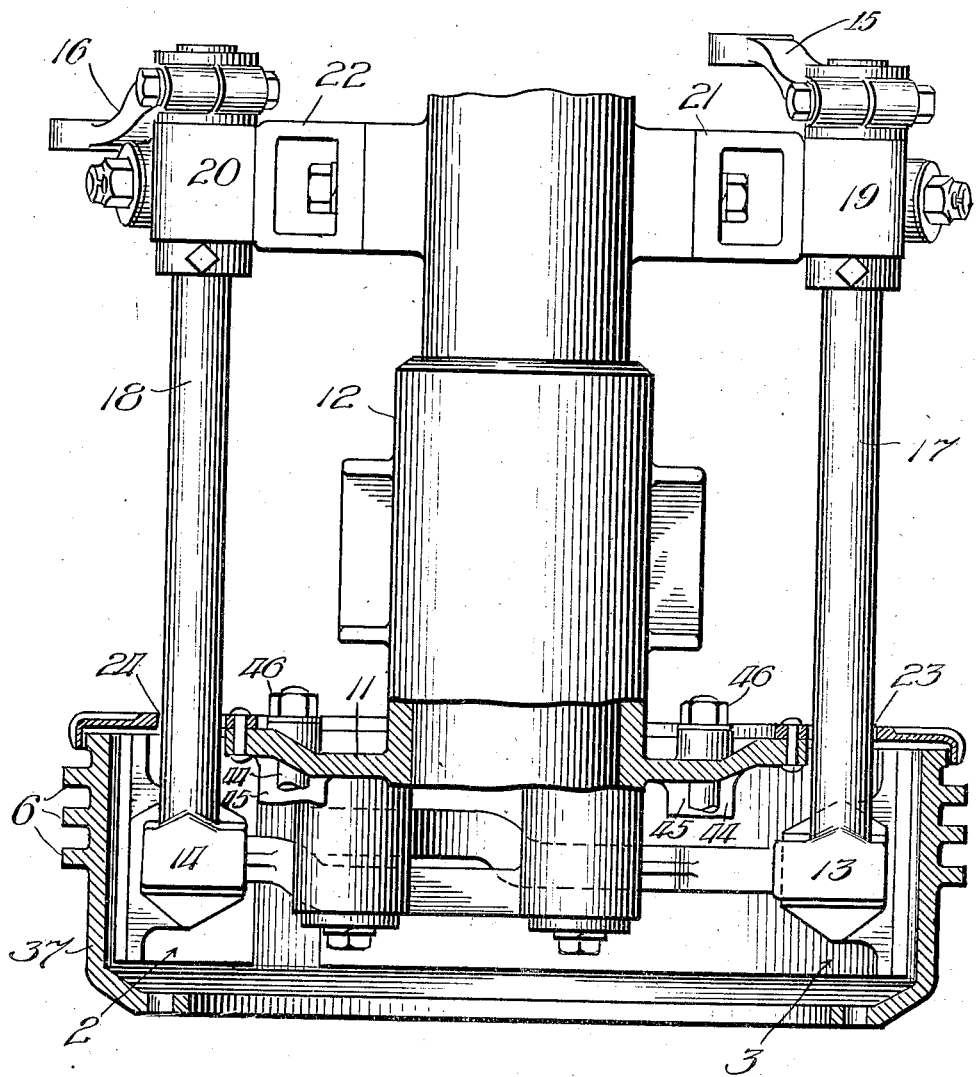
Fig. 3 is a view similar to Fig. 2, with parts omitted and also showing in plan the cam operating lever arms and associated parts.

Fig. 10 is a fragmentary view showing a method of giving more motion to one shoe of a set of brake shoes without bodily movement of the actuating means by providing a longer cam lever arm for the shoe having the greater wear, which, if the resilient or yielding positioning means for the free ends of the brake shoes is applied to the actuating means, serves to avoid bodily movement of the actuation means by reason of unequal wear of the brake shoe liners as they wear in service.

Fig. 11 is a fragmentary section showing in detail the equalizer bar 42 and its associated parts.

As seen in Fig. 1 I have provided brake shoes 1, 2, 3 and 4 within the brake drum 5, which carries upon its outer circumference cooling and stiffening ribs 6. Shoes 1, 2, 3 and 4 are pivotally mounted upon anchor pins 7, 8, 9 and 10, respectively, which anchor pins are mounted in the brake spider 11 carried by the stationary outer member 12 of the rear axle assembly. The position of each of the anchor pins 7, 8, 9 and 10 with relation to the center of the brake drum, and the relative arrangement of the brake shoe arc of contact with relation to a diameter through the anchor pin, are of great importance, as will hereinafter more fully appear. This arrangement enables all four of the brake shoes to be arranged in the same plane (i. e. in substantially the same circular path) within the brake drum in circular succession therein. These brake shoes work in pairs, as, for example, shoes 3 and 4 cooperate under action of the service brake pedal, while shoes 1 and 2 work together under action of the emergency brake lever. Shoes 3 and 4 are spread apart and rotated about their anchor pins 9 and 10 by means of the floating cam 13, while shoes 1 and 2 are given a spreading movement and rotation about their anchor pins 7 and 8, respectively, by means of rotation of the floating cam 14. Spreading movement of shoes 3 and 4 is effected through suitable connection from the brake pedal to the end of lever 15, and shoes 1 and 2 are operated by suitable connection from the emergency brake to the outer end of lever 16, which levers 15 and 16 (see Fig. 3) are fixed to the inner end of cam shafts 17 and 18, respectively, which carry, at their outer ends cams 13 and 14, respectively. Floating movement of these cams is effected as a result of shafts 17 and 18 being mounted respectively in bearing members 19 and 20, which are each rotatably connected with supporting members 21 and 22 so as to be capable of rotation in a plane substantially perpendicular to a radius drawn from the brake drum center to the cam center. This permits shafts 17 and 18 to have a certain amount of vertical movement through slots 23 and 24, which latter are of sufficient length to prevent abutment of these cam shafts with the end of the slot. This enables cams 13 and 14 to rise and fall sufficiently to permit them to follow up movement in either direction as necessary of the shoes being operated thereby. For example, if the relative clearance between the brake linings of shoes 3 and 4 and the brake drum is such that one or the other of these shoes strikes the inner surface of the brake drum first, this floating arrangement of the cam will enable it to follow up the movement of the other shoe, transmitting at all times a substantially equal pressure upon the two shoes as distinguished from a journalled cam, in which under such circumstances the greater part of the pressure would be upon the shoe striking the drum first, until its lining was worn down, to permit an equal pressure of the other shoe against the brake drum when stationary.

After the linings of a set of shoes having a journalled cam have worn to a seat and thus eliminated the effect of manufacturing tolerances on contact both shoes may engage the drum simultaneously and exert equal pressures against the drum when the latter is stationary. If, however, the drum is rotating, the frictional forces assist, or in other words, act to rotate the self-actuating shoe about its anchor pin in the same direction of rotation as the cam action. In the case of the non-self-actuating shoe, the frictional forces act to rotate the shoe in the opposite direction of rotation as does the cam force. Accordingly, the rotation of the drum causes a transfer of pressure until the torque of the cam pressure on the non-self-actuating shoe, minus the frictional torque on that shoe, is substantially equal to the torque of the cam pressure on the self-actuating shoe plus the frictional torque on that shoe. It is obvious, therefore, that the non-self-actuating shoe will have a much higher cam pressure than the self-actuating shoe. By floating the cam a differential action is obtained and the cam pressures are substantially equal with drum stationary or rotating. Accordingly, one half of the actuating force on the cam shaft will always go to the more sensitive self-actuating shoe.

Movement of the brake shoes away from the brake drum upon release of the cams is effected for shoes 3 and 4 by release springs 25 and 26, and for shoes 1 and 2 by release springs 27 and 28. These springs, as shown in Fig. 1, are connected in pairs, one spring of each pair being hooked through a suitable eye or opening in the brake shoe at their outer end.

The inner end of each spring is equipped with a plug 41 screwed into the spring, the pitch and shape of the threads on the outside of the plugs corresponding to the spaces between the coils of the spring. These plugs are threaded to take the centralizer bar 42, which has a right hand thread on one end and a left hand thread on the other end. This centralizer bar is preferably made of hexagon or square stock so that it can be turned with an ordinary wrench, which turning will either draw the spring plugs 41 together or allow them to move further apart, depending on direction in which the centralizer bar is turned. Accordingly, the centralizer bar operates as a turn buckle and provides for an easy adjustment of the release spring tension. The centralizer bar 42 passes through eye 43 of bolt 44 which fits in a recess 44a formed by projections 45 of the brake spider 11. The shank of the eye bolt passes through a hole in the brake spider and is threaded to take nut 46. When nut 46 is tightened the eye bolt 43 clamps the centralizer bar 42 against projections 45 of the brake spider, preventing any movement of the centralizer bar. Projections 45 hold eye bolt 43 from turning as nut 46 is tightened. If the nut 46 is loosened with the brake shoes in engaged position the centralizer bar will move to a position of equilibrium, at which the tension of the release springs will be equal. If the centralizer bar 42 is now clamped in this position by tightening the nut 46, the shoes on being released will move out of engagement with the drum to a spring balance position.

The equalization of the tension of the release springs and the resultant centralization of the shoes with respect to the brake drum when in released position is thus accomplished in a manner similar to that described in my copending application Serial No. 573,946, filed July 10, 1922. The exact respective distance thus moved by each shoe can be varied by the relative rate of the two springs, the weight of the assembly being in spring balance, the tension of the release spring and the effect of this tension by reason of the ratio of the effective lever arms through which the springs act to the respective lever arms of the shoes through which the actuating or cam force acts, or by the use of an auxiliary spring. As will be shown in a later paragraph these various factors may be varied to result in substantially equal clearance between the shoes and the drum at point of minimum radial motion of each shoe respectively.

Each of the shoes is provided with a suitable brake lining 33.

Rotation of the hub is transmitted from axle shaft 34 through suitable connections at the outer end of the axle shaft to member 35, to which is fixed by bolts 36, or the like, the brake drum 37 (see Fig. 2). Suitable dust guards 38 may be provided to prevent entrance into the brake mechanism of dust, dirt, and the like. As is readily understood the axle housing 39 is stationary and in fixed relation to the outer member 12 carrying the brake spider 11. The element 35, which rotates with the axle shaft 34, is mounted upon the stationary axle housing by means of roller bearings or other anti-friction elements 40.

If the centralizer is positioned for equal tension of the release springs with the shoes in contact with the drum and disregarding the weight of the shoes, the ratio of the respective lever arms through which the cam acts to the respective lever arms through which the release springs act must be the same if bodily movement of the cam is to be avoided as the shoes move out of engagement with the drum. Referring to Fig. 1 and designating these effective lever arms as C for the effective cam lever arm and S as the effective lever arm through which the spring acts on the shoe, and using the sub-numerals to indicate the shoe referred to, it is obvious that, disregarding weight $$\frac{S_1}{C_1} \text{ must equal } \frac{S_2}{C_2} \text{ and } \frac{S_4}{C_4} \text{ must equal } \frac{S_3}{C_3},$$

in order to avoid bodily movement of the cam on release. However, weight must be compensated for, and it is also desirable to have equal clearances at the points of minimum radial motion of the two shoes of a set respectively. Any desired ratio of release motion of the two shoes, respectively, when released after the centralizer has been clamped in position at a point of equal tension with shoes applied can be obtained by any one of the following methods.

1. Attaching the release springs to the brake shoes to give the desired ratio of $$\frac{S}{C} \text{ of the top shoe to } \frac{S}{C}$$

of the bottom shoe as exemplified in shoes 3 and 4 of Fig. 1.

2. By varying the angle of the cam plate or otherwise changing the line of action of the actuating means on the shoe as exemplified in shoes 1 and 2 of Fig. 1.

3. By increasing the rate or stiffness of the bottom release spring as shown in Fig. 4.

4. By the use of an auxiliary spring as shown in Fig. 9.

5. A combination of any or all of above methods.

If it is desirable to use only one set of shoes in a brake drum a common anchor pin may be used and the arc of lining so positioned on the shoes with relation to a diameter through the anchor pin center as to give equal amounts of actuation. It is, of course, desirable to avoid necessity for frequent centralization as the shoes wear, and were both shoes equipped with the same area of liner the self-actuating shoe would wear much faster. As the life of a set of liners is really the life of the liner wearing out first, the life of a set of such brakes would not be decreased by decreasing the area of the lining on the non-self-actuating shoe for forward motion. As previously stated it is to be noted that on the usual automotive vehicle the amount of braking in reverse direction of motion is substantially negligible compared to the braking in forward direction of motion. Accordingly, as shown in Fig. 4 the area of the non-self-actuating shoe for forward direction of motion is made substantially less than on the self-actuating shoe, the arrow indicating forward rotation. The reduction in area can be effected by shortening the arc of contact, decreasing the width, or a combination of both. The mechanical advantage of two brake shoes respectively, i. e. ratio of total radial pressure on liner to cam or actuating pressure with drum stationary, i. e. disregarding effect of frictional forces, may not be the same even though the shoes have the same amount of actuation notwithstanding different anchor pin ratios or different arcs of contact. By anchor pin ratio is meant the ratio of brake drum radius to distance from brake drum center to anchor pin center. It is desirable to have substantially the same actuation characteristics for both shoes as the variation in braking effort with a given variation of coefficient of friction changes rapidly as the actuation factor of a shoe is changed. However, it may be desirable to have slightly more effective brakes in forward direction of motion than in reverse.

Any desired ratio of effectiveness within reasonable limits can be obtained in a brake having floating actuation means even though both shoes have the same actuation characteristics by varying the effective mecahnical advantage of the shoes proper. If a cam actuating means is used the position of and length of cam are usually determined by other considerations as is also the direction of rotation of the cam so as to get the center of the cam shaft operating lever eye in about the same horizontal plane as the torque center of the axle and spring assembly, i. e. at a substantially neutral point, by which is meant a point at which the motion of the lever eye about the torque center of the axle and spring assembly is substantially perpendicular to the brake operating rods. The mechanical advantage of shoes for any cam design and any given direction of rotation of cam may be varied by varying the cam plate angle or line of force of the actuating means. Or the same result can be accomplished by the use of separate anchor pins for each shoe, and varying the effective lever arm through which the actuating force (cam pressure in this case) acts, by the position of the anchor pin.

I do not wish to limit myself to mechanical means of floating the actuating means, as the same results may be obtained by the use of hydraulic means as shown in Fig. 5, and the same characteristics of brake design, shoe proportioning, anchor pin location, centralization, may be used with equally satisfactory results. If hydraulic means are used as shown in Fig. 5 the mechanical advantage of the shoes may be varied by changing the line of direction of the piston force, or as shown in Fig. 6, the same results of controlling the ratio of braking in one direction to braking in the opposite direction may be accomplished by using cylinders of different diameters. Or if cylinders of same diameter are used and a linkage is provided between the piston motion and the brake element proper the mechanical advantage of this linkage can be varied as shown in Fig. 7. Fig. 8 illustrates another method of controlling the ratio of forward to reverse braking by varying the position of the point of application of the actuating force. This is of great importance as, though any degree of sensitiveness can be obtained by self-actuation up to a self-locking brake, there is a practical limit to the amount of actuation advisable, due to possible variations in coefficients of friction, and it may be desired to obtain greater sensitiveness in forward direction of rotation than in reverse at a sacrifice of sensitiveness in reverse, but without increasing the danger of locking in forward or reverse due to a rise in coefficient of friction.

This same principle is applicable to external brakes in which the part of the band on each side of the anchor pin corresponds to the self-actuating and non-self-actuating brake members herein described as illustrated in Fig. 7.

It will be noted that the centers of anchor pins 7, 8, 9 and 10 are at different distances from the center of the drum, and diameters passing through these anchor pins have a different position with reference to the arc of brake lining of the shoes operating on these anchor pins respectively. These anchor pins are so positioned as to give substantially the same actuating characteristic to all the shoes and accordingly the braking action for a given effort on the actuation means would be substantially the same in either direction of rotation (by reason of the cam distributing its pressure equally between the two shoes brought about by its floating or differential action) modified, of course, by the respective effective mechanical advantage of the shoes proper. If two sets of identical brakes are used, i. e. having the same self-actuating and same non-self-actuating shoes, respectively, the anchor pins for the self-actuating shoes of both sets would be at the same distance from the center of the drum, and a diameter through these anchor pins would bear the same relation to the arcs of contact of these self-actuating shoes, the same applying to the anchor pins of the non-self-actuating shoes. However, the distance from the center of drum to anchor pin and relation of diameter through anchor pin to arc of lining would not be the same for the self-actuating shoes as compared to the non-self-actuating shoes of the sets.

Having now described my invention, I claim:—

1. A brake for automotive vehicles comprising a brake drum, and four brake shoes within the drum, said shoes being in the same plane and not of equal length and arranged to be independently operable in pairs.

2. A brake for automotive vehicles comprising a brake drum, two pairs of shoes within the drum, one shoe of each pair being smaller than its complemental shoe, said shoes all being in the same plane and arranged to be independently operable in pairs.

3. A brake for automotive vehicles comprising a drum, a pair of service brake shoes of unequal area and a pair of emergency brake shoes of unequal area pivotally mounted within said drum to lie in substantially the same plane, substantially floating means for spreading the toes of each pair of shoes apart to swing the shoes of the pair about their pivots and into braking contact with the inner face of the drum, the pivotal center of each shoe being so located with relation to the drum center and arc of lining as to cause one shoe of the pair in action to be urged against the inner face of the drum by the frictional forces to substantially the same degree that the opposing shoe would be urged against the drum in the opposite direction of rotation with the same actuating force, the variation not to exceed fifty per cent of the urging action of the shoe having the greater such action.

4. A brake for automotive vehicles comprising a drum, four shoes pivotally mounted in said drum to lie in substantially the same plane; and a substantially floating cam for each pair of said shoes for spreading the shoes into contact with the drum one shoe of each pair having a smaller area of contact with the drum than its complemental shoe.

5. A brake for automotive vehicles comprising a drum, four shoes pivotally mounted in said drum to lie in substantially the same plane, and substantially differentially acting actuation means for each pair of said shoes for moving the shoes into contact with the drum, one shoe of each pair having a smaller area of contact with the drum than its complemental shoe.

6. A brake for automotive vehicles comprising a drum, two sets of shoes pivotally mounted in said drum to lie in substantially the same plane, differentially acting actuation means for each set of shoes for spreading the shoes into contact with the drum, the shoes of each set being of unequal length.

7. In a brake for automotive vehicles, a drum, four brake shoes pivotally mounted within said drum to lie in substantially the same plane, said shoes being arranged in pairs, the shoe of each pair having positive self-actuation for forward movement of the vehicle being greater in area than its complemental shoe.

8. In a brake for automotive vehicles, a drum, four brake shoes pivotally mounted within said drum to operate in substantially the same circular path, said shoes being arranged in pairs, the shoe of each pair having positive self-actuation for forward movement of the vehicle being greater in length than its complemental shoe, and substantially differentially acting actuating means for each pair of shoes for spreading the shoes thereof into braking contact with the drum.

9. In a brake for automotive vehicles, a drum, four brake shoes pivotally mounted within said drum to operate in substantially the same circular path, said shoes being arranged in pairs, the shoe of each pair having positive self-actuation for forward movement of the vehicle being greater in length than its complemental shoe, a substantially floating actuating means for each pair of shoes for spreading the shoes thereof into braking contact with the drum, each of said shoes having a separate anchor pin.

10. In a brake for automotive vehicles, a drum, four brake shoes pivotally mounted within said drum to lie in substantially the same circular path, said shoes being arranged in pairs, the shoe of each pair having positive self-actuation for forward movement of the vehicle having greater contact area than its complemental shoe, and substantially differentially acting actuating means for each pair of shoes for moving the shoes thereof into braking contact with the drum, and resilient means for normally positioning the shoes of each pair.

11. In a brake for automotive vehicles, a drum, four brake shoes pivotally mounted within said drum to lie in substantially the same circular path, said shoes being arranged in pairs, the shoe of each pair having positive self-actuation for forward movement of the vehicle being greater in length than its complemental shoe, substantially differentially acting actuating means for each pair of shoes for moving the shoes thereof into braking contact with the drum, resilient means for normally positioning each pair of shoes, and means associated with said resilient means to allow said resilient means to take a position of equilibrium of internal forces with shoes in engaged position.

12. In a brake for automotive vehicles, a drum, four brake shoes pivotally mounted within said drum to lie in substantially the same circular path, said shoes being arranged in pairs, the shoe of each pair having positive self-actuation for forward movement of the vehicle being greater in length than its complemental shoe, a floating cam for each pair of shoes for spreading the shoes thereof into braking contact with the drum, resilient means for normally moving the shoes of each pair toward each other, and means for positioning the free ends of the shoes and cam by equilibrium of forces due to the resiliency of a distorted member.

13. In a brake for automotive vehicles, a drum, four shoes mounted in said drum having unequal contact area, and substantially differentially acting actuating means for moving said shoes into braking contact with the face of the drum, said shoes arranged to be independently operable in pairs.

14. In a brake for automotive vehicles, a drum, a plurality of brake shoes pivotally mounted in said drum, the pivotal center of each shoe being so located as to give that shoe substantially the same amount of self-actuation as each of the others when the drum is rotating in the same relative direction to the shoe under consideration at least one of said shoes having a contact area less than the others.

15. In a brake, a drum, a plurality of brake shoes having different areas of contact with said drum, pivotally mounted in said drum, the position of the arc of contact with said drum of said shoes with respect to a diameter drawn through the pivot center of said shoes being such that the self-actuation of each shoe is substantially the same for the length of arc of contact and pivot point location of such shoes.

16. In a brake, a drum, a plurality of brake shoes having different areas of contact with said drum, pivotally mounted in said drum, the position of the arc of contact with said drum of said shoes with respect to a diameter drawn through the pivot center of said shoes being such that the self-actuation of one of the shoes, when considered as a self-actuating shoe, is not less than fifty per cent of the self-actuation of the shoe having the greatest self-actuation when considered as a self-actuating shoe.

17. In a brake, a drum, a plurality of brake shoes having separate anchor pins at different distances from the brake drum center, pivotally mounted in said drum, the position of the arc of contact with said drum of said shoes with respect to a diameter drawn through the pivot center of said shoes being such that the self-actuation of one of the shoes, when considered as a self-actuating shoe, is not less than fifty per cent of the self-actuation of the shoe having the greatest self-actuation when considered as a self-actuating shoe.

18. In a brake for automotive vehicles, a drum, a plurality of brake shoes having unequal area of contact with the said drum, pivotally mounted in said drum, the pivotal center of each shoe being so located as to give that shoe substantially the same amount of self-actuation as each of the others when the drum is rotating in a direction to produce positive self-actuation for the shoe under consideration, said shoes being four in number and arranged to lie in substantially the same plane.

19. In a brake for automotive vehicles, a drum, a plurality of brake shoes having unequal contact area with drum, pivotally mounted inside said drum, the pivotal center of each of said shoes being so located angularly with relation to the shoe and radially with relation to the drum as to give each shoe substantially the same amount of self-actuation as each of the other shoes.

20. In a brake for automotive vehicles, a drum, a pair of brake shoes having unequal area of contact with drum, movable toward and from said drum, means for moving said shoes into contact with the drum, springs for moving the shoes away from the drum upon release of said drum, a movable centralizer member to which one end of each spring is attached, means to normally hold said member against motion but permit motion thereof when desired to equalize the resilient force in said springs.

21. Braking mechanism comprising a brake drum, a braking element movable toward and from the face of the drum, said braking element having a section of decreasing rigidity in a plane perpendicular to the axis of brake drum rotation towards points on said braking element at which points the ratio of the effective lever arm through which the frictional force acts about the hinge point to the effective lever arm through which the radial force at that same point acts about the hinge point is greater than the reciprocal of the coefficient of friction between the braking element and drum, to allow greater deflection at these points for a given unit radial pressure than were the shoe to have a substantially uniform rigidity.

22. In a braking mechanism, a brake drum, a pair of brake shoes, substantially differentially acting actuating means to move said shoes into engagement with said drum, yielding means for positioning the free ends of said shoes, the self actuating shoe of said pair of brake shoes considering the direction of rotation against which most braking is done to have sufficiently greater area of contact with said drum to cause the point on that shoe at which the yieldable positioning means functions to move substantially the same distance as the point on the other shoe at which the yieldable positioning means functions as the brake wears in service.

23. In braking mechanism, a brake drum, a pair of brake shoes, a release spring for each of said shoes, a centralizer bar secured between said springs, and means on said bar for changing the tension in said springs upon rotation of said bar.

24. In braking mechanism, a brake drum, two sets of brakes, each set consisting of two brake members of unequal contact area, all of said members operating in substantially the same circumferential path, separate means for moving the brake members of each set into contact with the drum, and means to substantially equally distribute the force of the brake member actuating means between the brake members of each set.

25. In braking mechanism, a brake drum, two sets of brakes, each set consisting of two brake members of unequal contact area, all of said members operating in substantially the same circumferential path, separate means for moving the brake members of each set into contact with the drum, and means to substantially equally distribute the force of the brake member actuating means between the brake members of each set, and yielding means for positioning each pair of shoes.

26. In a brake for automotive vehicles, a brake drum, a pair of brake shoes having ends spaced apart, a substantially floating cam having arms of unequal length arranged to spread said spaced apart ends to bring said brake shoes into frictional contact with said drum, the longer arm of said cam cooperating with the self actuating shoe for forward direction of vehicle travel, said self actuating shoe having a larger area of contact with said drum than the non-self actuating shoe.

27. In braking mechanism, a brake drum, a pair of unlike brake shoes movable into and out of contact with said drum, individual anchor pins for each shoe, a substantially differentially acting actuating means arranged to move said shoes into contact with said drum, said shoes, said anchor pins and said actuating means being so arranged that the effective lever arm through which the actuating force acts on one shoe is greater than the corresponding lever arm through which it acts on the other shoe.

28. A braking mechanism comprising a drum, a pair of brake shoes having ends spaced apart, a cam between said spaced apart ends arranged to have a differential action to equalize the pressure between the cam and the shoes, said cam acting on said spaced apart ends through unequal lever arms arranged to give more motion to the end of one shoe than to the end of the other shoe without differential movement of the cam.

29. In a braking mechanism, a brake drum, a relatively stationary anchor member, a pair of unlike shoes, each shoe having one free end and the other end pivoted on an anchor pin attached to said anchor member, said free ends being spaced apart, a substantially differentially acting actuating means arranged to spread said shoes into frictional engagement with said drum and arranged to give more motion to the free end of the self actuating shoe for forward direction of vehicle motion than to the end of the other shoe without differential motion of the actuating means.

30. In a brake, a brake drum, a pair of shoes having spaced apart ends, and a cam operating between said spaced apart ends, said ends being provided with surfaces substantially parallel to each other at some time during the life of the shoe linings, said surfaces having an angular relation to a radial line extending through the center of rotation of the cam.

31. In a brake, a brake drum, a pair of shoes having spaced apart ends, and a cam operating against the surface of said ends, which surfaces are so positioned that the directions of the lines of force delivered to the shoes by the cam are substantially parallel but have an angular relation to a perpendicular to a radial line extending through the center of rotation of the cam.

32. In a brake, a brake drum, a brake anchor, a pair of shoes, differentially acting actuating means for said shoes, one of said shoes having a greater arc of contact with the drum than the other, and anchor pins for said shoes fixed to said anchor and forming pivots for said shoes, the pivot point of the shoe having the longer arc of contact being further from the center of said drum than the other.

33. A brake for automotive vehicles comprising a brake drum, and four brake shoes within the drum, said shoes being in the same plane and not of equal length, each shoe having a fixed pivot.

34. A brake for automotive vehicles comprising a brake drum, two pairs of shoes within the drum, one shoe of each pair being smaller than its complemental shoe, said shoes all being in the same plane, each shoe having a fixed pivot.

35. In a brake for automotive vehicles, a drum, a plurality of brake shoes pivotally mounted in said drum, the pivotal center of each shoe being so located as to give that shoe substantially the same amount of self-actuation as each of the others when the drum is rotating in the same relative direction to the shoe under consideration, said shoes arranged to be operated in pairs, one shoe of each pair having a greater contact area than its complemental shoe.

36. In a brake for automotive vehicles, a pair of brake shoes, each shoe being continuous throughout its length and independently rotatable, said shoes having different lengths of brake lining.

37. In a brake for automotive vehicles, a drum, a pair of brake shoes, each shoe being continuous throughout its length and mounted for independent rotation, said shoes having different areas of lining for contact with said drum.

38. In a braking mechanism, a drum, a pair of pivotally mounted brake shoes in said drum, each of said shoes having a separate anchor pin and being continuous throughout its length, each of said anchor pins having its center at a different radial distance from the drum center than the other.

39. In a braking mechanism, a drum, a pair of brake shoes each having a lining of different length from the other and being continuous throughout its length, a separate anchor pin for each shoe, the centers of said anchor pins being at different distances from the brake drum center.

40. In a braking mechanism, a drum, a pair of brake shoes, actuating means for spreading said shoes, each of said shoes having a separate anchor pin and being continuous throughout its length, said anchor pins being located at different distances from the actuation means.

41. In a braking mechanism, a drum, a pair of brake shoes, actuating means for spreading said shoes, each of said shoes having a separate anchor pin and being continuous throughout its length, said anchor pins being located at different distances from the actuation means, said shoes having different length of arcs of contact with said drum.

42. In braking mechanism, a brake drum, a pair of brake members of unequal braking area, each member being pivotally mounted for swinging movement toward and away from the drum and being continuous throughout its length, the pivotal centers of the brake members being located at different distances from the drum center.

43. A brake for automotive vehicles comprising a drum, a pair of brake shoes within said drum, one of said shoes having positive self-actuation for rotation of the brake drum corresponding to forward motion of the vehicle and the other having negative self-actuation for such rotation, each shoe being continuous throughout, the acting face of the shoe having said positive self-actuation being of greater area than that of the other shoe and substantially differentially acting actuating means for bringing said shoes into frictional engagement with said drum.

44. A brake for automotive vehicles comprising a drum, a pair of brake shoes within said drum, each shoe being continuous throughout, the shoe having positive self-actuation for forward motion of the vehicle being greater in length than the other shoe and substantially differentially acting actuating means for bringing said shoes into frictional engagement with said drum.

45. A brake for automotive vehicles comprising a drum, a set of brake shoe elements within said drum, each shoe being continuous throughout, substantially differentially acting actuating means arranged to bring the shoes of said set of brake shoe elements in contact with the drum, the area of contact of the shoe element on which the action of the frictional forces for forward direction of vehicle motion assists the actuating force being greater than the area of contact of the shoe element on which the action of the frictional forces oppose the actuating force for forward direction of rotation.

46. In a brake for automotive vehicles, a pair of brake shoes, each shoe being continuous througout its length, individual anchor pins for each of said shoes, said shoes having different lengths of brake lining, and substantially differentially acting actuating means for bringing said shoes into frictional engagement with said drum.

47. In a brake for automotive vehicles a drum, a pair of brake shoes, each shoe being continuous throughout its length, individual anchor pins for each of said shoes, said shoes having different areas of lining for contact with said drum, and substantially differentially acting actuating means for bringing said shoes into frictional engagement with said drum.

48. In a braking mechanism, a drum, a pair of brake shoes, each shoe being continuous throughout its length, actuating means for spreading said shoes, each of said shoes having a separate anchor pin, said anchor pins being located at different distances from the actuation means, said actuating means being floating.

49. In a braking mechanism, a drum, a pair of brake shoes, each shoe being continuous throughout its length, actuating means for spreading said shoes, each of said shoes having a separate anchor pin, said anchor pins being located at different distances from the actuating means, said shoes having different length linings, said actuating means arranged to divide its effort between each brake shoe in substantially the same ratio regardless of direction of drum rotation.

50. In a braking mechanism, a drum, a pair of brake shoes, each shoe being continuous throughout its length, a substantially floating cam for spreading said shoes, means for moving said shoes toward each other upon release of the spreading force, brake lining upon each shoe, the exposed lining face on one shoe being of different area than that on the other shoe.

51. In a braking mechanism, a drum, a pair of brake shoes each rotatably mounted in said drum, each shoe being continuous throughout its length, substantially differentially acting actuating means for spreading said shoes, each of said shoes having a separate anchor pin located at a different distance from the drum center than the other anchor pin.

52. In braking mechanism, a brake drum, brake members each pivotally mounted in said drum, each member being continuous throughout its length, means to spread said brake members into engagement with said drum, and means to divide the spreading force substantially equally between the said brake members, said brake members having unequal areas of contact with the brake drum.

53. In braking mechainsm, a drum, brake shoes each independently pivoted and continuous throughout its length, floating actuating means for moving the shoes into contact with the drum, the working area of the self-actuating shoe for direction of rotation used mostly being greater than the working area of the non-self-actuating shoe.

54. In braking mechanism, a brake drum, a pair of internal brake shoes, each shoe being continuous throughout its length and independently pivoted, substantially floating means for actuating said shoes, said shoes having unequal area of contact with said drum.

55. In braking mechanism, a brake drum, a pair of internal brake shoes, each shoe being continuous throughout its length and independently pivoted, substantially floating means for actuating said shoes, said shoes having unequal area of contact with said brake drum, and yielding means for positioning the free end of the brake members.

56. In braking mechanism, a brake drum, a set of independently pivoted brake members associated with said drum, each of said members being continuous throughout its length and of different contact area than the other, means for moving the members into contact with said drum, and means for substantially equally distributing the force of the brake member actuating means between the two said members.

57. In braking mechanism, a brake drum, a set of independently pivoted brake members associated with said drum, each of said members being continuous throughout its length and of different contact area than the other, means for moving the members into contact with said drum, and means for substantially equally distributing the force of the brake member actuating means between the two said members, each of said brake members having a separate anchor pin.

58. In a brake for automotive vehicles, a brake drum, a pair of independently pivoted brake shoes having ends spaced apart, each shoe being continuous throughout its length, a substantially floating cam having arms of unequal length arranged to spread said spaced apart ends to bring said brake shoes into frictional contact with said drum, the longer arm of said cam cooperating with the self-actuating shoe for forward direction of vehicle travel, said self-actuating shoe having a larger area of contact with said drum than the non-self-actuating shoe.

59. In braking mechanism, a brake drum, a pair of independently pivoted unlike brake shoes movable into and out of contact with said drum, each shoe being continuous throughout its length, individual anchor pins for each shoe, a substantially differentially acting actuating means arranged to move said shoes into contact with said drum, said shoes, said anchor pins and said actuating means being so arranged that the effective lever arm through which the actuating force acts on one shoe is greater than the corresponding lever arm through which it acts on the other shoe.

60. A braking mechanism comprising a drum, a pair of independently pivoted brake shoes having ends spaced apart, each shoe being continuous throughout its length, a cam between said spaced apart ends arranged to have a differential action to equalize the pressure between the cam and the shoes, said cam acting on said spaced apart ends through unequal lever arms arranged to give more motion to the end of one shoe than to the end of the other shoe without differential movement of the cam.

61. In a braking mechanism, a brake drum, a relatively stationary anchor member, a pair of unlike shoes, each shoe being continuous thoughout its length, each shoe having one free end and the other end pivoted on an anchor pin attached to said anchor member, said free ends being spaced apart, a substantially differentially acting actuating means arranged to spread said shoes into frictional engagement with said drum and arranged to give more motion to the free end of the self-actuating shoe for forward direction of vehicle motion than to the end of the other shoe without differential motion of the actuating means.

62. In a brake, a brake drum, a brake anchor, a pair of independently pivoted shoes, each shoe being continuous throughout its length, differentially acting actuating means for said shoes, one of said shoes having a greater arc of contact with the drum than the other, and anchor pins for said shoes fixed to said anchor and forming pivots for said shoes, the pivot point of the shoe having the longer arc of contact being further from the center of said drum than the other.

In witness whereof, I hereunto subscribe my name to this specification.

LOUIS C. HUCK.